United States Patent [19]

Wake

[11] Patent Number: 5,068,808
[45] Date of Patent: Nov. 26, 1991

[54] IMAGER AND PROCESS

[75] Inventor: Robert H. Wake, Solon, Ohio

[73] Assignee: Reality Imaging Corporation, Solon, Ohio

[21] Appl. No.: 274,912

[22] Filed: Nov. 22, 1988

[51] Int. Cl.$^5$ ............................................. G06F 3/14
[52] U.S. Cl. ................................. 395/119; 364/731;
364/413.19; 382/44
[58] Field of Search .................................. 382/44–47;
364/518, 521, 522, 731, 413.13, 443.19

[56] References Cited

U.S. PATENT DOCUMENTS 4,101,967 7/1978 Majduk ............................... 364/900
4,415,928 11/1983 Strolle et al. ....................... 358/140

Primary Examiner—David L. Clark
Attorney, Agent, or Firm—Pearne, Gordon, McCoy & Granger

[57] ABSTRACT

An apparatus and process for the flexible and rapid manipulation of multidimensional data is disclosed. Coordinates ae transformed by the use of a plurality of transform memories, each being addressable by a coordinate of an n-tuple. Each member provides an intermediate value that when added to others provides a transformed coordinate. This eliminates the need for high-speed multipliers. The transform memories are additionally addressable by flags and tags associated with the location, attribute or object of interest. Different transformations take place depending on the values of the flags and tags. This allows flexible manipulation of the data. Z-buffering is done at high speed in parallel with the results being combined in efficient combiner circuits. In addition, this parallel operation permits the transformations themselves to be done in parallel. By adding a selectable adder to the input of the z-buffers, normal z-buffer operation may be selected or a radiographic mode utilizing the entire width of the z-buffer to hold an accumulated intensity may be selected.

11 Claims, 7 Drawing Sheets

IMAGER AND PROCESS

BACKGROUND OF THE INVENTION

This invention relates to an apparatus and method for the manipulation and coordinate transformation of multidimensional data.

Many of the medical imaging modalities, such as CT, MR, PET and SPECT, produce three-dimensional representations of the anatomy or physiology under study. However, current medical practice is to review this data in a two-dimensional fashion, typically as a large number (20 to 100) of parallel slices arrayed side-by-side. The physician is called upon to mentally integrate these slices into an understanding of the actual locations of objects within the patient. Radiologists, after much practice, are able to do this, but the referring physician, with much less practice, may have difficulty.

The disclosed invention allows the presentation of the diagnostic imaging information to the physician in such a way that he can directly appreciate the full spatial and contrast range of the data and interact with this information to optimize his understanding of the subject.

The problem of representing 3-D objects is not unique to medicine. The field of CAD/CAM has done considerable work in computer representation of 3-D objects and some of these techniques have been applied to medicine.

In general, objects in CAD/CAM are represented by surfaces and are assumed to be of a homogeneous composition. This technique is inappropriate for representing medical imagery since it eliminates all contrast information in the data by preselecting a surface. The only medical application that may be appropriate for these "surface rendering" techniques is for the presentation of bone structures to orthopedic surgeons. Even for this application, the surface rendering techniques are flawed since the a priori discrimination of bone from non-bone can be difficult where osteoporosis has reduced the bone density or where partial volume effects reduce the bone-tissue contrast.

Several groups have recognized the value of preserving the contrast or density information in the volume data set and the value of presenting this information as well as the 3-D representation of the subject.

Systems based on the concept of encoding the 3-D information into an Octree, a linked hierarchical data structure, and processing the Octree into a (2-D) displayable format have been built, see U.S. Pat. No. 4,694,404, incorporated herein by reference. There are two chief disadvantages with the Octree approach however. Firstly, the Octree processing engine is currently very expensive. Secondly, the image data must be converted from their original voxel format to an Octree format. This operation need only be done once per volume data set, but is very time consuming, requiring hours or substantial fractions of an hour on a general purpose minicomputer.

A more straightforward approach has also been used. In this approach, the system stores volume data in voxel form and maps the 3-D object into a 2-D space with a "back-to-front" or "painters algorithm". This back-to-front algorithm entails reading the 3-D volume in an order such that pixels which are being written into the 2-D display space are always nearer to the observer than previously written pixels and thus obscure those previous pixels. Thus, the analogy to a painter, where fresh paint obscures older paint. The exact reading order of 3-D voxels will be a function of observer perspective (the orientation of the object).

The advantages of this approach are that no "z-buffer" is required and the data are retained in their original (voxel) format. A z-buffer is required whenever the back-to-front read-out order cannot be preserved and is the way that objects are made to superimpose properly. A z-buffer algorithm states that if a new pixel is to be written in observer space, its depth with respect to the observer (z dimension) determines whether it is written or discarded. If the new pixel is nearer the observer than any old pixel, it overwrites (obscures) the old pixel. Otherwise the new pixel is behind the old pixel and is discarded. The back-to-front approach eliminates this decision, since the new pixel is always nearer the observer and always overwrites the old pixel.

While the back-to-front approach represents an implementation advantage it also limits the flexibility of the transform process. Specifically, it is often required to transform different portions of the volume data set differently, where no back-to-front order could be maintained.

The present invention allows the rapid and efficient transformation of different portions of the data set. This allows independent transformation of different objects and/or portions of objects. In addition, it allows costly and inherently slow multiplier circuits to be avoided in the transform process.

Part of the present invention is a means and process for performing the z-buffering and/or the coordinate transformation in parallel fashion. The utility of this technique is not limited to just medical imaging.

In general, some representation of a 3 dimensional object or scene is processed within a 3-D transformation engine. The method of representation can vary, from coordinates of polygon vertices, as is commonly done in CAD/CAM, or as voxels, 3-D picture elements, or as Octree nodes. The 3-D transformation engine performs the transformations that transform from the object's space to the observer's space. However, the output of the 3-D engine is usually not ordered in any way, and does not account for hidden surface removal.

The 3-D engine outputs a serial stream of 3-D coordinates and a value or values associated with each coordinate. These 3-D coordinates are observer space position (x and y) and depth (z) relative to the observer. The value(s) are some measure of the object at that coordinate, such as composition, color, density, temperature, etc. What will be visible to the observer are only those features in the object that are nearest the observer; features behind other features are obscured. A z-Buffer is employed to perform this hidden feature or hidden surface operation.

The z-buffer algorithm is well-known and relatively straightforward to implement, but it inherently presents a bottleneck. For every new coordinate, the old depth must be retrieved from a depth memory, the old and new depths must be compared, and the new depth and value might have to be written into the respective memories. This means that three operations have to be performed in the time it takes to generate one new coordinate n-tuple, an n-tuple being the n coordinates necessary to describe an n-dimensional space. By implementing this process in a parallel form, the present invention avoids this bottleneck. Additionally, the coordinate transformation can also be performed in parallel, further speeding the process.

The result of the z-buffer operation is that the observer sees the surfaces of the nearest objects. In some situations, however, this may not be the most desirable presentation. In radiation therapy, it is important to know what objects lie both in front of the object of interest and behind it. The traditional surface presentation can often not provide this information. For this application, it is more desirable to present a "translucency" view, where all the objects in the scene are visible, but superimposed. The best analogy to this view is a conventional radiograph, which superimposes all structures. The present invention allows the z-buffers to be operated in two modes: the normal mode and a "radiographic" mode where a translucency view is presented instead of the normal surface view.

SUMMARY OF THE INVENTION

The present invention is an apparatus and process for the manipulation of multidimensional data having one or more values associated with a coordinate n-tuple, particularly 3-D data having one or more values or other attributes associated with each spatial point.

By storing transformation functions in memory rather than calculating the function for each transformation, the invention avoids slow and expensive multipliers. Intermediate values for the contribution of each old coordinate to the new coordinate are stored in memories and the values added to calculate the new coordinate.

In addition, the invention allows the flexible transformation of the input data based on spatial and other attributes of the input data. Through the use of transform flag(s) and transparency flag(s) different transform regimes are engaged.

The use of memory resident functions lends itself to altering the transformations according to the characteristics of the transformed data. The invention allows the altering of the transformation by addressing different functions in memory with the transform flag(s).

Further, the invention allows the use of parallel processing to speed up the transformation process. A combiner circuit is used to allow the use of parallel z-buffers to eliminate the z-buffer bottleneck. This same technique allows the coordinate transformations themselves to be done in parallel further improving performance.

An additional feature of the invention is the implementation of dual mode z-buffers that allow either normal operation or a radiographic mode where intensity or contrast values are added for coincident display points. This is done by the addition of an adder and a multiplexer to the z-buffers.

DESCRIPTION OF THE PREFERRED EMBODIMENT

The general form of a 3-D coordinate transform is:

$$x' = C_1^*(x+x_0) + C_2^*(y+y_0) + C_3^*(z+z_0) + K_1$$

$$y' = C_4^*(x+x_0) + C_5^*(y+y_0) + C_6^*(z+z_0) + K_2$$

$$z' = C_7^*(x+x_0) + C_8^*(y+y_0) + C_9^*(z+z_0) + K_3$$

where:
- x, y, z are the coordinates of the input space (the 3-D volume of data);
- x', y', z' are the coordinates of the output space (the observer or CRT screen);
- $C_1$ through $C_9$ are coefficients determined by the 3 angles of rotation between input space and output space;
- $x_0$, $y_0$, $z_0$ are the rotation center coordinates in input space; and
- $K_1$, $K_2$, and $K_3$ serve to position (offset) the image in output space.

This transform allows rotation through any angle, translation, and scaling or zooming the input with respect to the output. It may be readily extended to include n-dimensional coordinate systems having n coordinates.

Figure 1:
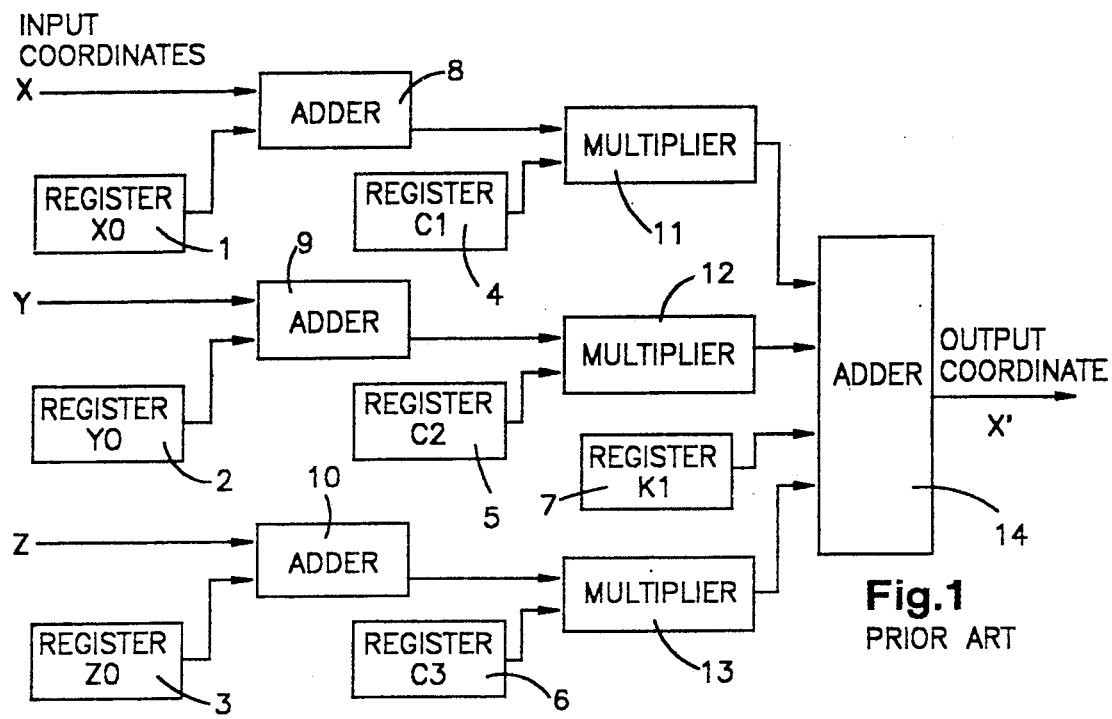
FIG. 1 is a block diagram of a typical prior art transform circuit for calculating a single transformed coordinate.

A typical prior art hardware implementation of one transform term (x') is shown in FIG. 1. Note that the y' and z' terms would use an identical circuit with different labels.

Registers 1, 2, 3, 4, 5, 6, 7 hold the values $x_0$, $y_0$, $z_0$, $c_1$, $c_2$, $c_3$, and $k_1$, respectively. Binary full adders 8, 9, 10 each add the input coordinates x, y and z to $x_0$, $y_0$, and $z_0$, respectively. The output of adders 8, 9, 10 are then applied to multipliers 11, 12, 13, respectively and multiplied by $c_1$, $c_2$, and $c_3$, respectively. The outputs of multipliers 11, 12, 13 are then added together in adder 14 along with $k_1$. This output sum of adder 14 is a single coordinate of the transformed coordinate system, in this case x'.

Some external device, not shown, such as a general purpose computer, would calculate and load registers 1, 2, 3, 4, 5, 6, 7 with the equation coefficients.

Figure 2:
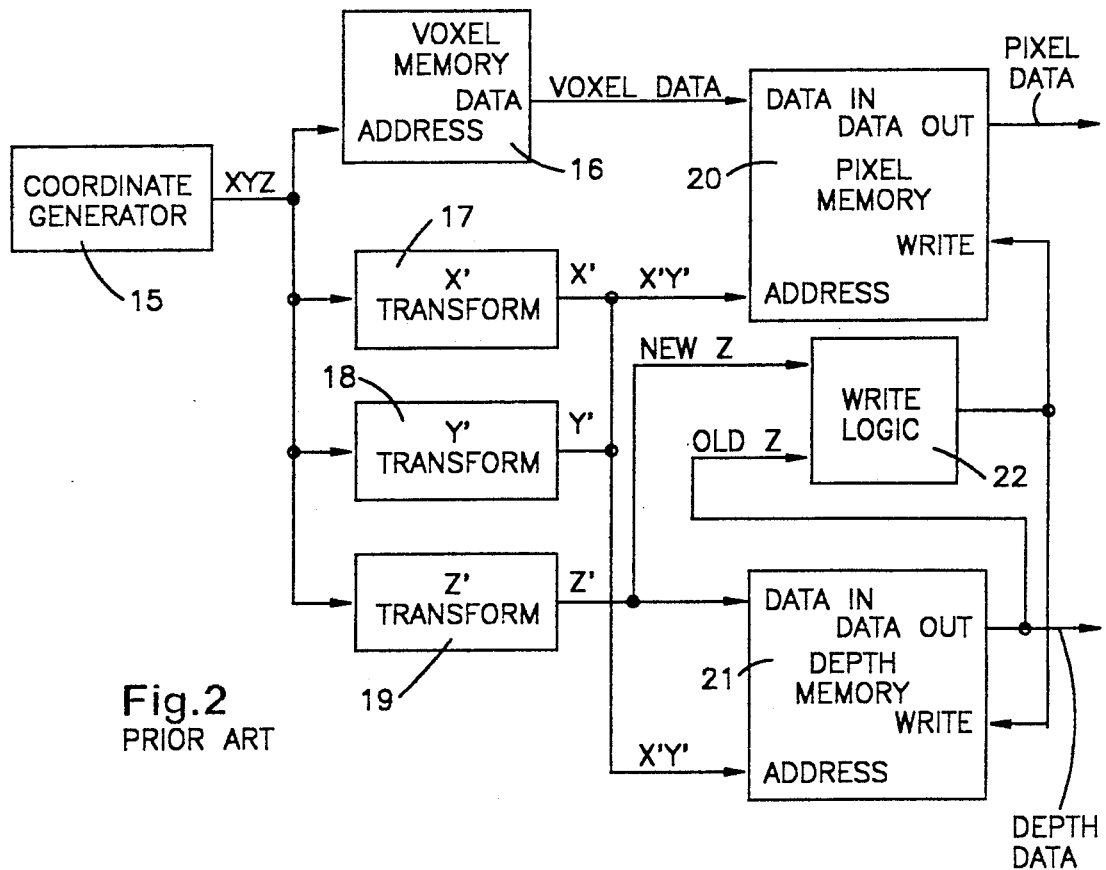
FIG. 2 is a block diagram of a typical prior art 3-D processor.

A typical 3-D processor appears as in FIG. 2. A coordinate generator 15, perhaps as simple as a counter, would generate the input coordinates xyz. Coordinate generator 15 would step through the input space. Say $2^{24}$ distinct xyz locations for a $256^3$ input data set. The xyz coordinates, each covering a range of 0 to 255 in this example, address the voxel memory 16 and are also sent to three copies of the circuit of FIG. 1, x'-transform 17, y'-transform 18 and z'-transform 19. The output of the voxel memory 16 is voxel data, values that, for example, represent the density or contrast at a particular xyz location. The output of the transforms 17, 18, 19 is are the x', y', and z' coordinates, which represent the coordinates of those voxels in the observer or display space. The voxel data and the x'y' coordinates are inputs to pixel memory 20. The x'y' and z' coordinates are inputs to depth memory 21. The z' coordinate (New z) is an input to write logic 22. Pixel memory 20, depth memory 21 and write logic 22 perform the z-buffer function mentioned before. For each new voxel at some x'y' location, its depth, z', is compared to the previously stored depth value (Old z) from depth memory 21. If the new depth (New z) is nearer the observer than the previously stored depth (Old z), the write logic 22 causes z' (New z) to be written to the x'y' location in depth memory 21 and the voxel data written to location x'y' in pixel memory 20. Otherwise, the new voxel will be discarded. After the coordinate generator of FIG. 2 has scanned the entire voxel memory 16 once, the depth memory 21 and pixel memory 20 contain the depth and density values of voxels (pixels in 2-D space) that represent the surface of the object (in voxel memory) that is visible to the observer. The output of pixel memory 20 is then pixel data and the output of depth memory 21 is depth data.

The 3-D processor of FIGS. 1 and 2 require relatively slow and expensive multipliers. The present invention eliminates multipliers 11, 12, 13 and adders 8, 9, 10 as well.

It can be seen that the above equations for x', y', and z' may be replaced by the following:

$$x' = F_1(x) + F_2(y) + F_3(z)$$

$$y' = F_4(x) + F_5(y) + F_6(z)$$

$$z' = F_7(x) + F_8(y) + F_9(z)$$

where:

$F_1$ through $F_9$ are functions of variables x,y,z as indicated, that is, the contribution of that old coordinate to the new coordinate, e.g. $F_1(x) = C_1*(x + x_0)$.

Given that the input variables x, y, and z are discrete, not continuous, the $F_n$ functions can be implemented as look-up tables stored in memories. For the previous example of a $256^3$ input volume, each $F_n$ memory is a 256×"m" output bits memory where m is, for example, 12 to 16 bits.

Figure 3:
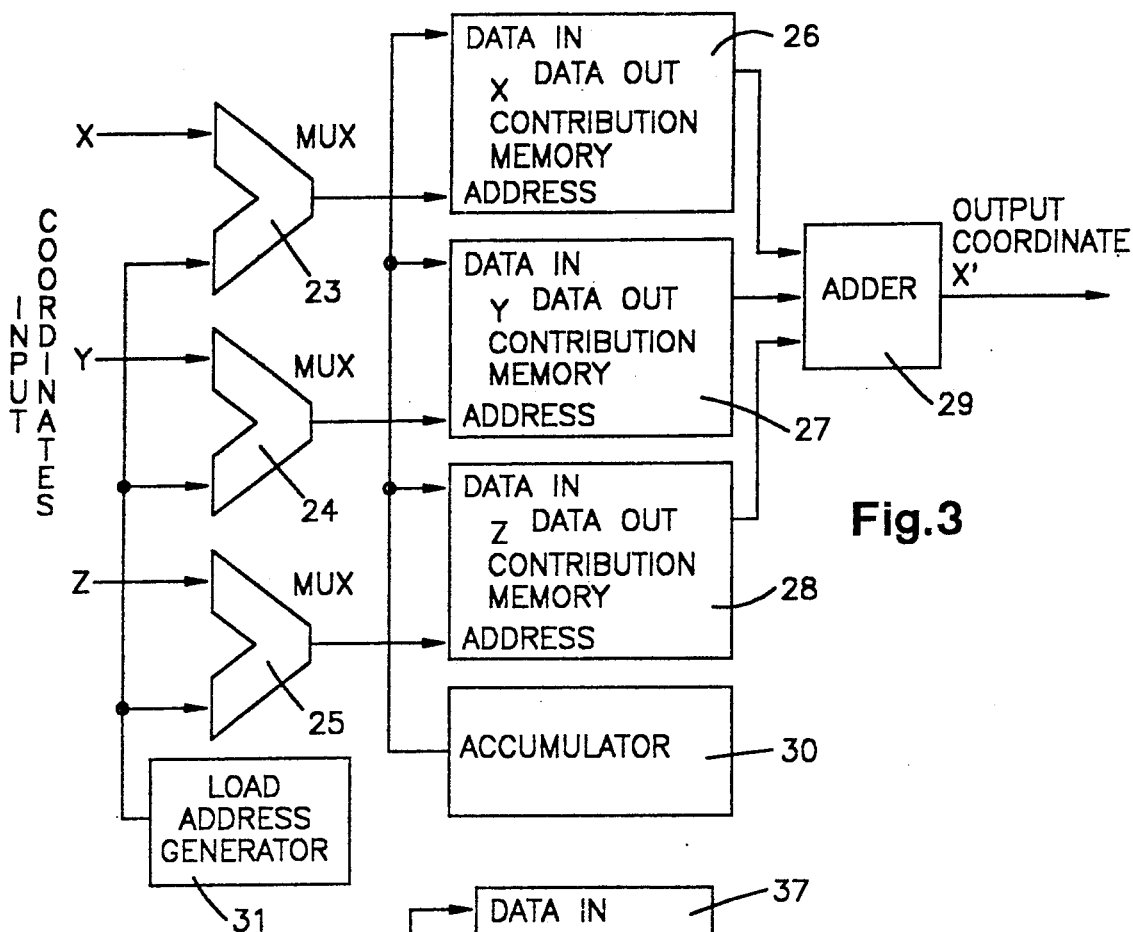
FIG. 3 is a block diagram of a transform circuit according to the invention for calculating a single transformed coordinate.

FIG. 3 shows the function of the circuit of FIG. 1 implemented according to the present invention. The $F_n$ functions are stored in memories. In normal transform operation, the multiplexers 23, 24, 25 would pass x, y, and z coordinates to the x-contribution memory 26, the y-contribution memory 27 and the z-contribution memory 28, respectively. The x, y, and z coordinates address the respective memories and the data out of each memory 26, 27, 28 is the value of $F_1(x)$, $F_2(y)$ and $F_3(z)$, respectively. The contribution memories 26, 27, 28 are then added in adder 29. The output of adder 29 is a single transformed output coordinate, in this case x'. Similar circuits are used for the other transformed coordinates y' and z'.

Prior to the transform operation, each contribution memory must be loaded with the appropriate data. The form of the data is:

$$F_1(x) = C_1*(x + x_0)$$

which can be rewritten as:

$$F_1(x) = A*x + B$$

where:

$A = C_1$ $B = C_1*x_0$.

The accumulator 30 can compute a linear equation of the form $F_1(x) = A*x + B$. In operation, an external device (not shown) such as a general purpose computer, would load the values A and B into the accumulator 30 (B as the initial accumulated value and A as the value to be added each cycle). The load address generator 31 would be set equal to zero. Hardware control logic (not shown) would then cause the x-contribution memory 26 ($F_1(x)$) at location x=0 to be written to the value B (through multiplexer 23). After this write operation, the accumulator 30 would be clocked once and the load address generator 31 would be clocked once. Repeating the write to x-contribution memory 26 would write the value A+B at location 1. Repeating the process would write 2*A+B at location 2, and so on. Repeating this operation 256 times (in this example) would load memory 26 completely with $F_1(x) = A*x + B$.

To completely reload all the contribution memories (memories 26, 27, 28 plus three equivalent memories (not shown) for each of the other two transformed coordinates y' and z'), the load address generator 31 and the accumulator 30 would be used 9 times for $F_1$ through $F_9$ respectively. The external computer could calculate the nine sets of A and B coefficients to perform the required rotation and translation of the Voxel Memory contents.

Alternatively, a general purpose microprocessor could calculate the A*x+B values and the load addresses and cause the transform data to be loaded into $F_1$-$F_9$. This approach is preferred if flexibility is a primary consideration.

Using look-up tables stored in memory has a cost and speed advantage versus the use of multipliers for performing the transform. Once loaded, the contribution memories operate on a speed comparable to the system clock speed. Multipliers on the other hand typically require many clock cycles and are much more expensive. Additionally, the look-up-table is more general than the multiplier, and while it can mimic the multiplier's function, it is also capable of different operations. The look-up-table could be loaded with a function different than A*x+B and therefore perform a non-linear transformation, which could correct for some distortion known to be present in the original volume data. If, in FIG. 3, the three contribution memories are coalesced into one (large) memory, any possible linear or nonlinear transformation can be generated.

Figure 4:
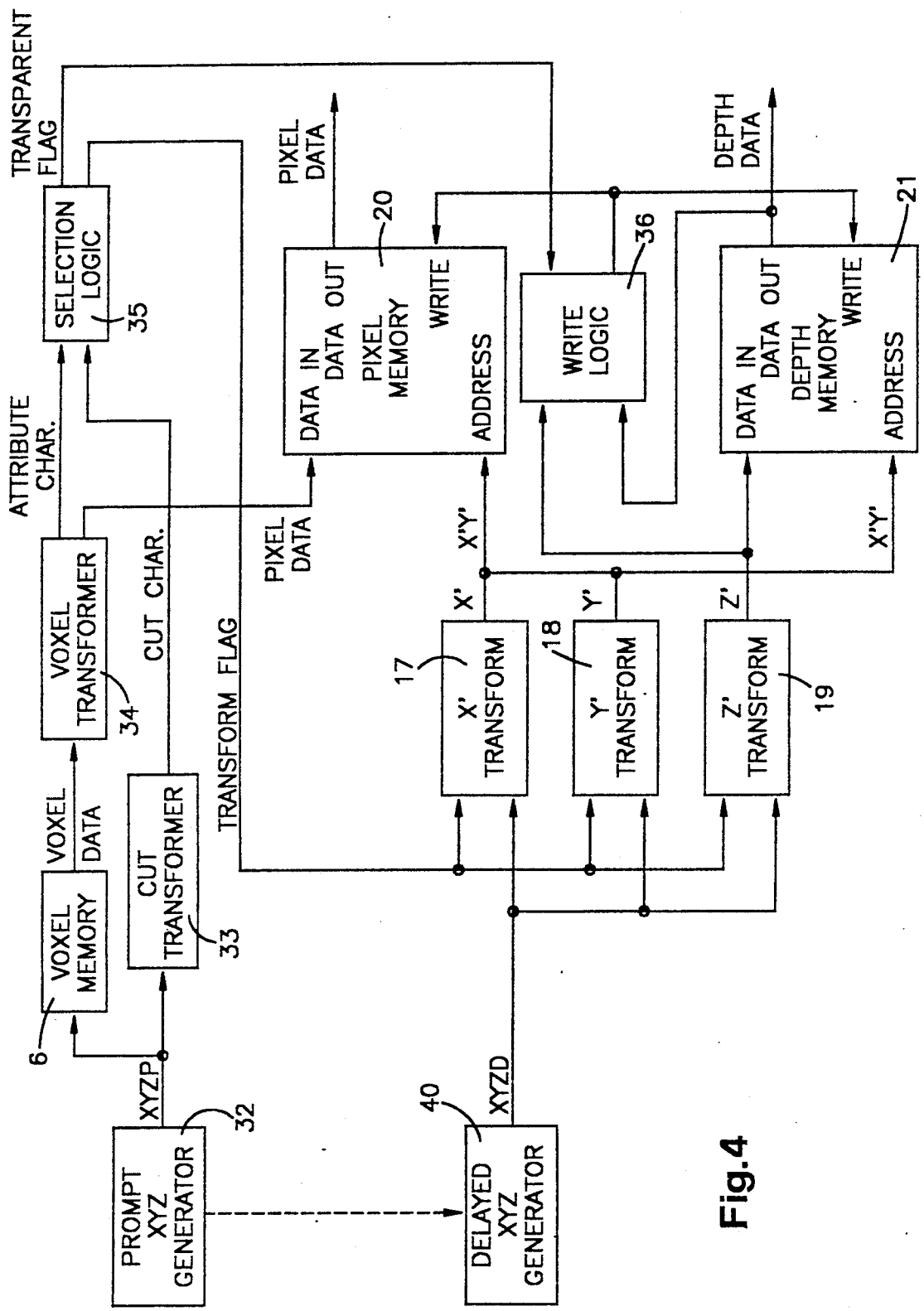
FIG. 4 is a block diagram according to the invention for a circuit to vary the transformation in response to cut transform and voxel transform criteria.

A particularly valuable capability in medical imaging is the ability to transform different portions of the data set based on coordinate, object and/or voxel characteristics. FIG. 4 illustrates a 3-D processor that provides this desired flexibility.

In FIG. 4, the prompt xyz generator 32 accesses the voxel memory 6 and cut transform 33.

Cut transform 33 is used to slice away a portion of the viewed volume in one of two ways:

a. A cut plane can be drawn through the viewing volume and all data on one side of the plane can be made transparent. This corresponds to slicing an apple into two pieces and discarding one piece to view the interior exposed by this cut plane.

b. A cut plane can be drawn through the viewing volume and the two pieces of the object transformed independently. This corresponds to slicing an apple into two pieces and viewing those pieces independently.

The cut char(acteristic) output by cut transform 33 is used to determine what transformation should be made relative to the cut plane.

Similarly, the voxel data from voxel memory 6 accesses the voxel transform 34. Voxel transform 34 is a memory with two outputs. One output labeled pixel data, is the value(s) associated with the xyz coordinates. This is usually contrast or grey scale information, typically an eight bit number, but may be other information or identifying tags. The second output, labeled voxel char(acteristic) is used in the same manner as the cut characteristic output from cut transform 33. As a function of the values of data from voxel memory 6, certain grey scale values can be made to be transparent and/or be transformed differently. Using the apple analogy, the flesh of the apple could be made transparent, exposing the seeds or the seeds could be moved outside the flesh and both displayed side-by-side.

In practice, cut transform 33 is implemented in the same manner as the transform circuit of FIG. 3. However, instead of providing as an output a transformed coordinate (e.g. x′), it would output a single bit, corresponding to the transformed coordinate greater than a limit (or coordinate<limit). To determine on which side of the cut plane a voxel lies, all that is required is to calculate the coordinate of that voxel in a direction perpendicular to that plane and to check that coordinate against a limit. Given the fact that the circuit of FIG. 3 can establish the origin of this "cut plane coordinate" anywhere (the transform allows both translation and rotation), it is sufficient to use the most significant bit (sign bit) as the cut characteristic.

The cut characteristic from cut transform 33 and the similar voxel characteristic from voxel transform 34 are inputs to selection logic 35 by which an external controlling device (not shown, e.g. a computer) would select which of these characteristics, or which Boolean combination of these characteristics, is passed to the x′, y′, and z′ transforms 17, 18, 19 as the transform flag(s) and passed to write logic 36 as a transparent flag. The preferred embodiment of the selection logic 35 is a look-up-table (memory), where the cut characteristic and the voxel characteristic are addresses to the memory, and the transform flag and transparent flag output from selection logic 35 are data outputs of the memory.

In the invention, the transform flag will cause the selection of a different translation recipe, while the transparent flag will cause the selection logic 36 to discard a voxel, therefore to be transparent.

Figure 5:
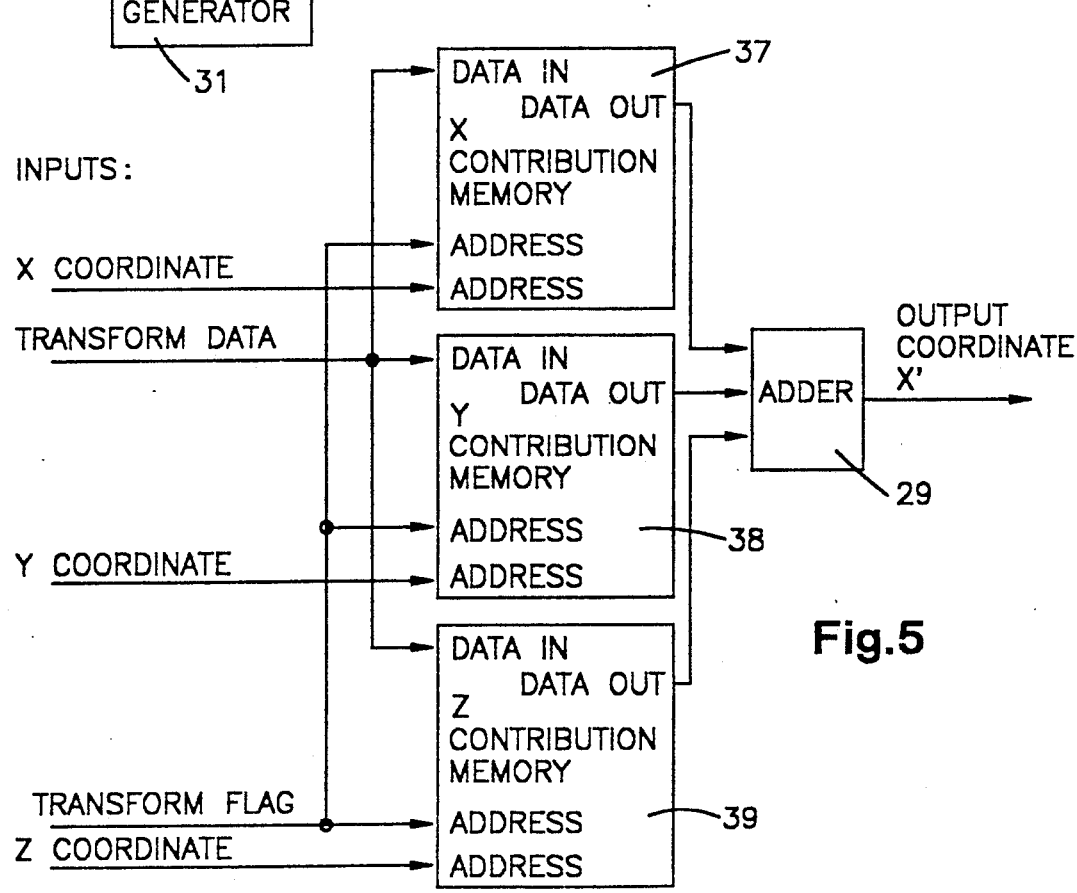
FIG. 5 is a block diagram of the circuit of FIG. 3 modified to function with the circuit of FIG. 4.

In order to utilize the rapid and efficient translation circuit of FIG. 3 with the transform flag circuitry of FIG. 4, the translation circuit of FIG. 3 must be modified as shown in FIG. 5. Each of the contribution memories 37, 38, 39 now has an additional address bit(s), namely the transform flag(s) from the selection logic. In the previous example, the contribution memories were 256 location memories and now would be 512 locations. Three circuits as in FIG. 5 would then be used as the transform circuits 17, 18, 19 of FIG. 4.

The transform flag could of course be several bits wide, allowing the object to by separated into $2^p$ different parts, where p is the number of transform flag bits and the number of memory locations in contribution memories 37, 38, 39 would each be $2^{p+8}$ for the example used. Several different cut transforms 33 could be used and/or several different voxel characteristic bits could come from the voxel transform 34 to allow segregating the object by several different density data characteristics.

In FIG. 4, there is a second XYZ generator, the delayed xyz generator 40 that supplies x, y, and z to the three transform circuits 17, 18, 19. The delayed xyz generator 40 performs the identical function as the prompt xyz generator 32, but is slightly later in time due to the time necessary for accessing the voxel memory 6 and obtaining the cut characteristic from cut transform 33.

If needed, multiple cut transforms can be employed in place of the single cut transform 33, in FIG. 4. This provides the ability to section an object into more than 2 pieces, or use combinations of cuts to remove wedge shapes from an object.

In the preferred embodiment, two bits of the voxel data stored in voxel memory 6 are tag bits. These tag bits are used to change the transform flag and transparent flag evaluation decisions to allow independent manipulation of objects within the scene.

The entire transformation engine can be replaced by a single large memory addressable by each coordinate, flag and tag. The output would then be the actual transformed point directly. The memory would constitute a direct mapping between the input space and the observer space.

Most 3-D processors, including those of FIGS. 2 and 4, require z-buffers (the combination of pixel memory, depth memory, and write logic, elements 20, 21, 22, respectively in FIG. 2 and elements 20, 21, 36, respectively in FIG. 4). This invention solves the bottleneck represented by the z-buffer, by employing multiple parallel z-buffers and combining their outputs at the end of the transformation process.

Figure 6:
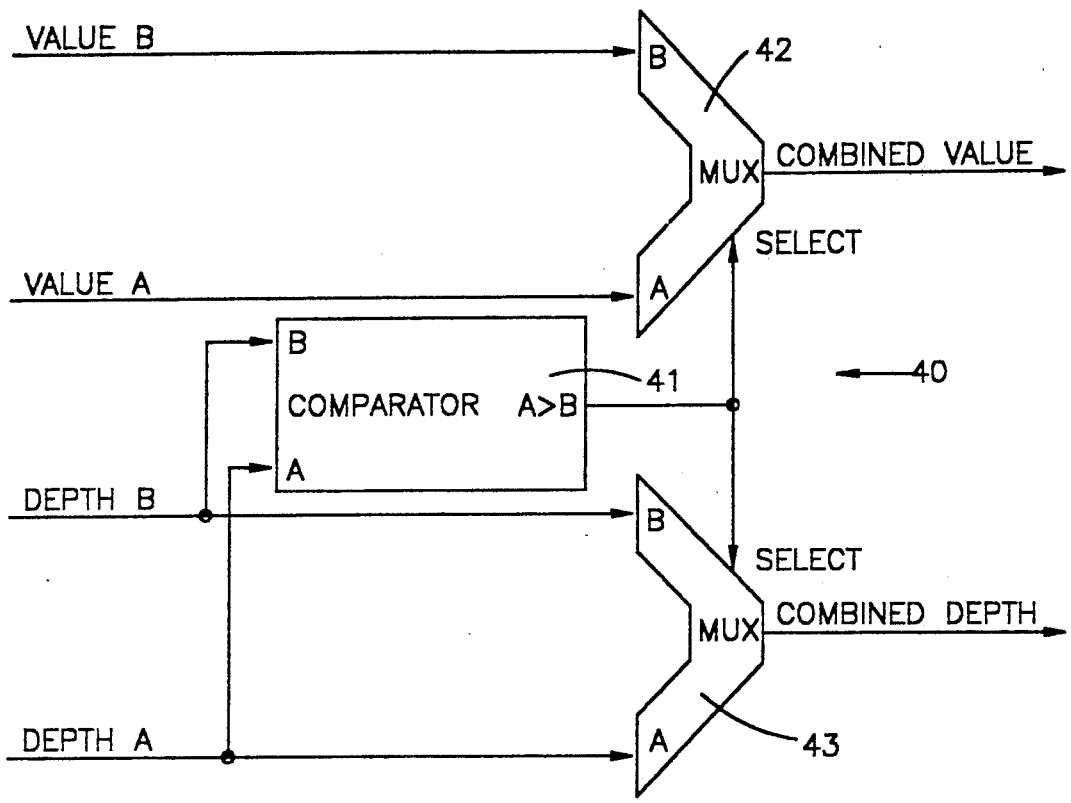
FIG. 6 is a block diagram of a circuit to combine the outputs of parallel z-buffers.

In FIG. 6, a combiner for combining the outputs of two z-buffers is indicated generally by numeral 40. Combiner 40 combines the outputs of two z-buffers into a single combined value and a single combined depth. It employs the same logic as the basic z-buffer operation, but acts on the outputs of two z-buffers. Namely, comparator 41 compares the input depth A with the input depth B and outputs a decision bit as to whether depth A is greater than depth B. This decision bit controls two multiplexers 42, 43. Multiplexers 42, 43 pass either value A and depth A or value B and depth B as a function of the decision bit.

Figure 7:
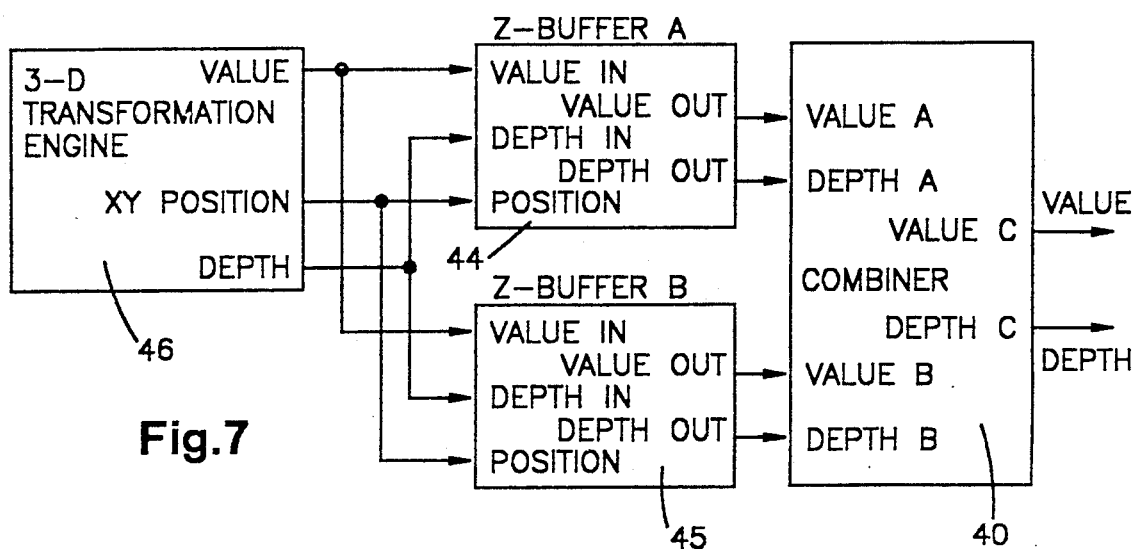
FIG. 7 is a block diagram of a 3-D processor utilizing parallel z-buffers.

FIG. 7 illustrates the use of combiner 40 with 2 z-buffers 44, 45 and a single 3-D transformation engine 46. The 3-D engine 46 is producing new coordinates faster than a single z-buffer could accept them. So two identical z-buffers 44, 45 are employed, each processing every other new coordinate, the control logic for which is not shown. At the end of the transformation process, each z-buffer 44, 45 will contain a partial representation of the final depth and value outputs. Neither will be correct (except by an unlikely accident). A read-out mechanism (not shown) will then read out z-buffers 44, 45 in synchrony by stepping through all of the possible positions. Thus each z-buffer will output its "opinion" as to the correct depth/value pair at each position or x′y′ address. The combiner 40 then selects the correct depth/value pair by determining which depth is nearer the observer and therefore visible. The output of combiner 40 is then the correct value and depth for each x′y′ coordinate.

Figure 8:
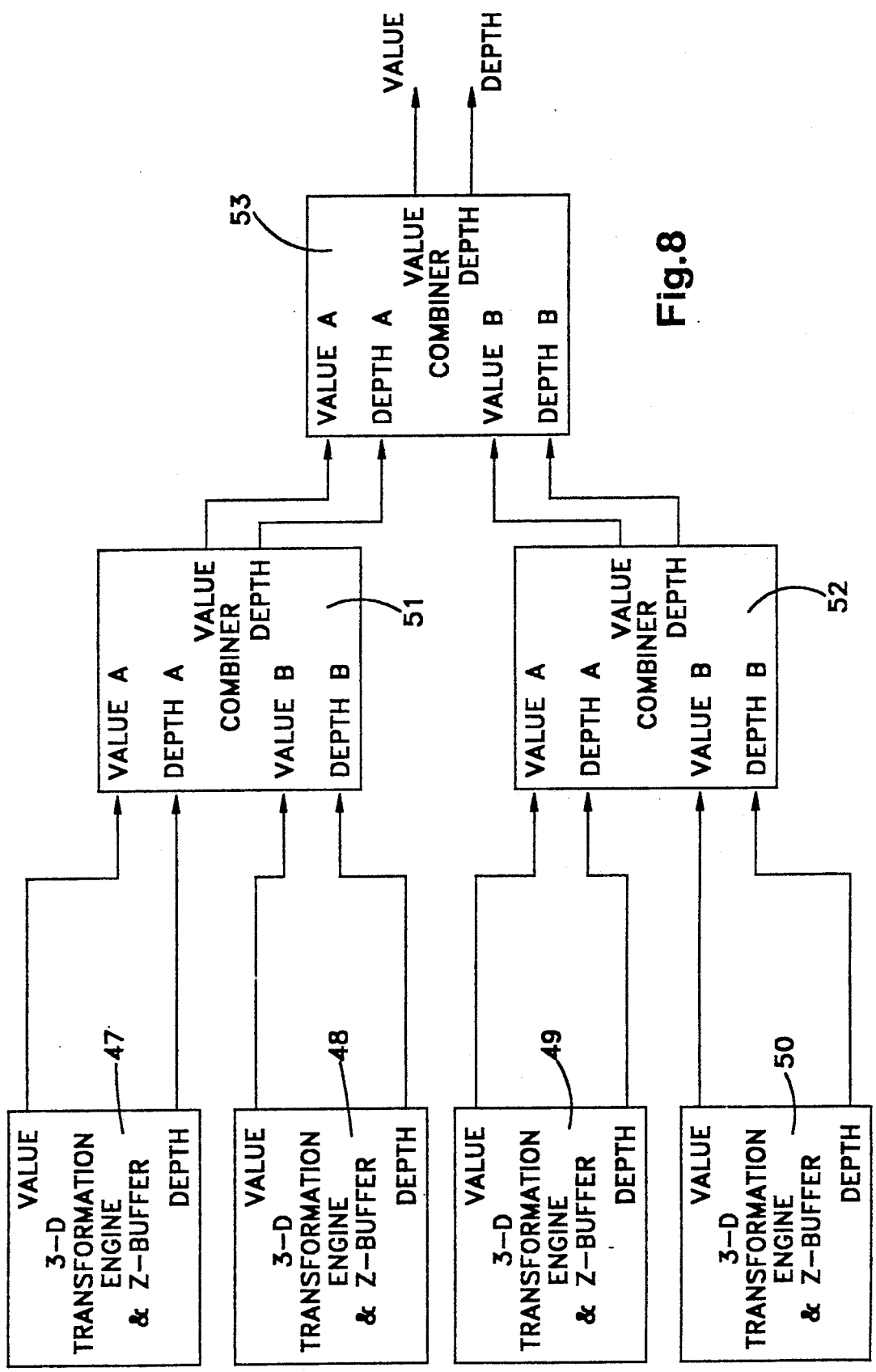
FIG. 8 is a block diagram of a 3-D processor utilizing both parallel transformation and z-buffering.

The combiner 40 of FIG. 6 allows the whole transformation process to be performed in parallel. This substantially increases speed and efficiency. In FIG. 8, four 3-D engines each with its own z-buffer are shown indicated by numerals 47, 48, 49, 50. Each engine would contain a portion of the object or scene to be transformed, in this case one-quarter of the object. Each engine would execute the same transformation on its portion of the object and store its "rendition" in its own z-buffer. The four Z-Buffers would be read out in synchrony. Combiner 51 would output the correct depth/value pair for the depth/value pairs stored in circuits 47 and 48 and combiner 52 would output the correct depth/value pair for the depth/value pairs stored in circuits 49, 50. Combiner 53 would then output the correct depth/value pair for the depth/value pairs output by combiners 51, 52.

This parallel transformation process could be broken down indefinitely finely, with these 2:1 combiners cascaded in a tree fashion. The practical limit is reached when the read-out and voting process takes longer than the transformation process, or when the cost of 3-D engines with z-buffers becomes prohibitive.

Figure 9:
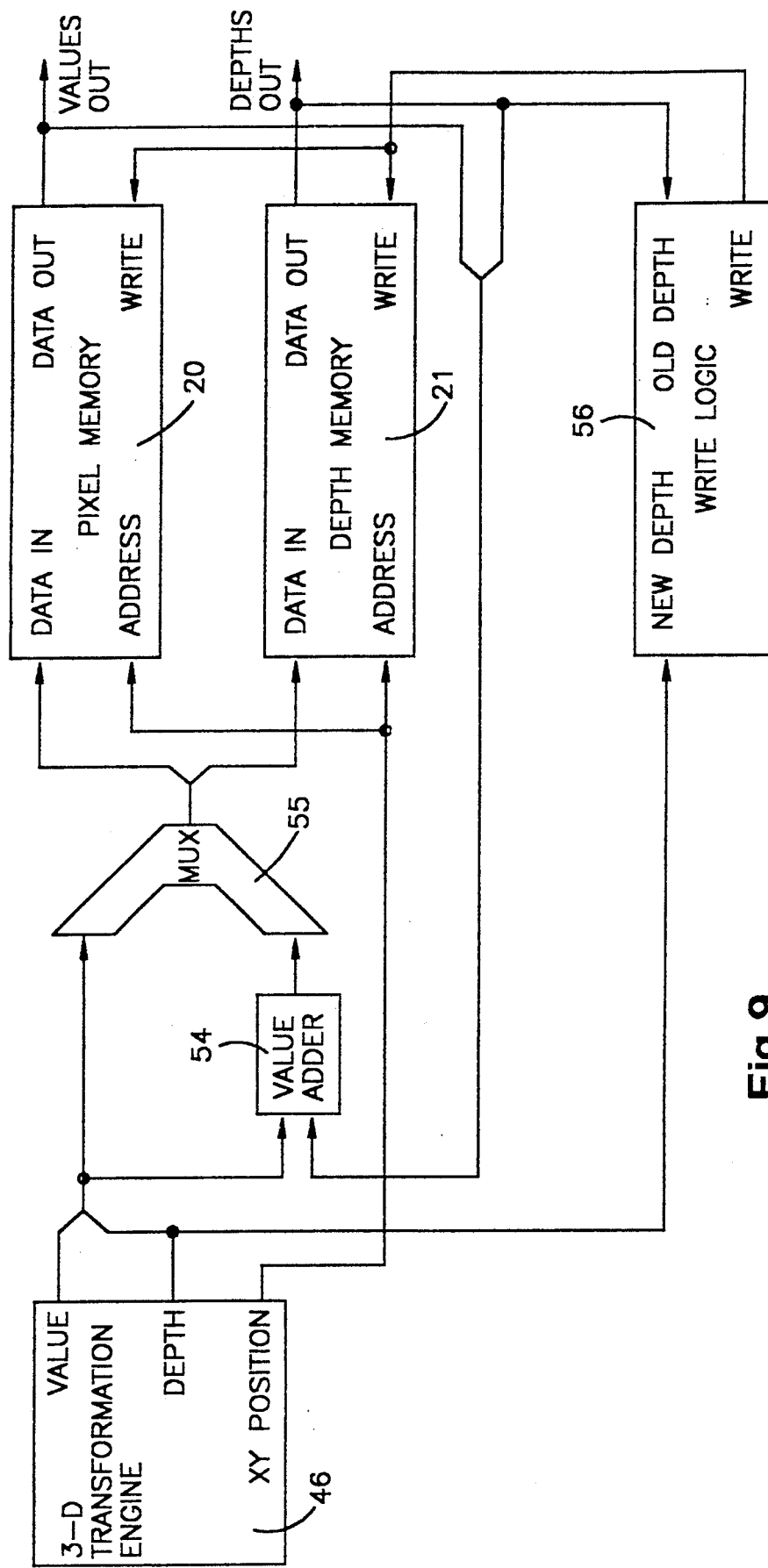
FIG. 9 is a block diagram of a dual mode z-buffer.

As discussed earlier, z-buffers output a surface relative to the observer which is not always the desirable result. FIG. 9 shows a dual mode z-buffer that is part of the invention. The dual mode z-buffer can operate in the usual or normal surfacing mode or in a radiographic (translucency) mode where the values of all coincident points are superimposed, i.e. summed.

In FIG. 9, two elements have been added to the normal z-buffer: value adder 54 and multiplexer 55. Value adder 54 adds the new values from the 3-D transformation engine 46 to the currently stored values from the pixel memory 20. The multiplexer 55, selects either the summed values from value adder 54 or the conventional depth and value information from transformation engine 46 to present as inputs to pixel memory 20 and depth memory 21.

In radiographic (translucency) mode, the multiplexer 55 will select the summed value data from value adder 54 and the write logic 56 will ignore the decision based on comparing old to new depth data. Thus the pixel memory 20 will act as an accumulator.

In normal or surfacing mode, the multiplexer 55 will select the value and depth data from transformation engine 46 and the write logic 56 will function as detailed previously. The output of the value adder 54 will be ignored.

In the preferred embodiment, both the pixel memory 20 and the depth memory 21 are, for example, 8 bits wide. This is adequate for normal z-buffer surfacing operation. Then in radiographic mode, the depth memory 21 is used as the upper 8 bits of pixel memory and the pixel memory 20 is used as the lower 8 bits of pixel memory, giving an effective 16 bit (accumulated) pixel memory. This additional width is very advantageous for the process of accumulating radiographic values.

Instead of adder 54 a special processor may be used. The special processor may, for example, be used to shade distant points or to create perspective in the images by implementing vanishing points and similar perspective features.

Figure 10:
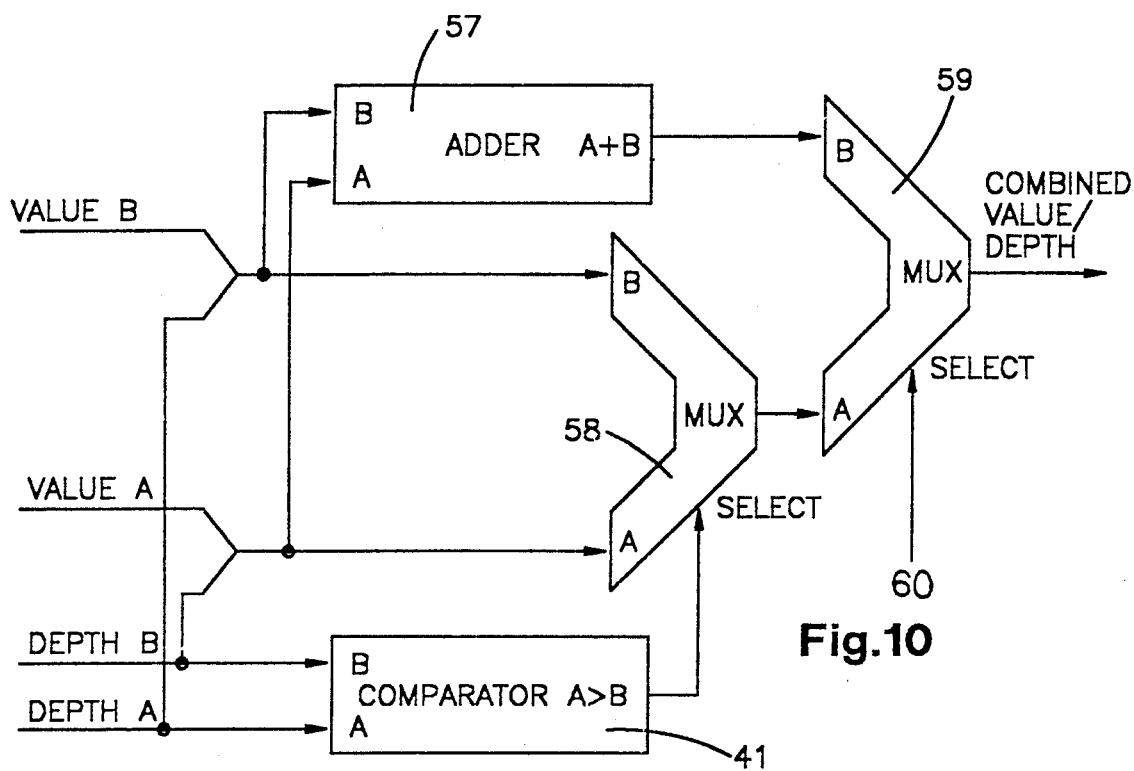
FIG. 10 is a block diagram of the circuit of FIG. 6 modified to function with parallel dual mode z-buffers.

In FIG. 10 the combiner circuit of FIG. 6 is shown modified to support the use of the dual mode z-buffer of FIG. 9 in parallel. Adder 57 adds the radiographic outputs (values A and B and "depths" A and B) of two dual mode parallel z-buffers. Multiplexer 58 passes either value A and depth A, or value B and depth B as selected by comparator 41. Comparator 41 selects value A and depth A if depth B is greater than depth A, otherwise it selects value B and depth B. Multiplexer 59 then selects either the normal value/depth pair or the double width radiographic value as selected by line 60.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A coordinate transform engine for transforming an image made up of a set of points, each point represented by at least an initial coordinate n-tuple, said transform engine comprising:
   a plurality of parallel transform memories addressable by a respective coordinate of the n-tuple and a transform flag of at least one bit, said memories each providing as an output an intermediate value in response to said coordinate and said transform flag, said transform flag corresponding to different portions of said image and selecting one of a plurality of transformations for said portions; and
   at least one adder receiving the output intermediate values from a subset of said memories, the sum from said adder being a single coordinate of a transformed coordinate n-tuple, whereby said portions can be separately manipulated.

2. A coordinate transform engine as in claim 1, further comprising means for computing the intermediate values stored in said memories.

3. A coordinate transform engine as in claim 2, wherein said computing means is an accumulator.

4. A coordinate transform engine as in claim 2, wherein said computing means is a microprocessor.

5. A coordinate transform engine as in claim 1, wherein said transform flag corresponds to different objects in said image, whereby a different transformation can be performed on at least one of the objects.

6. A cut transformer for determining the orientation of a set of points with respect to a plane, said points making up an image and being represented at least by a coordinate n-tuple, said cut transformer comprising:
   a plurality of parallel transform memories, each being addressable by one coordinate of the n-tuple, said memories each providing as an output an intermediate value in response to said coordinate; and
   at least one adder receiving the output intermediate values from a subset of said memories, the sum from said adder being a cut characteristic, said characteristic indicating which side of the plane a particular point in the image occupies and selecting one of a plurality of spatial transformations in response thereto, whereby each side of the image can be independently manipulated.

7. A cut transformer for determining the location of a set of initial points with respect to a plane, said initial points making up an image and being represented by at least an x, y and z initial coordinate and said plane establishing a transformed coordinate system having an x', y' and z' coordinate wherein said z' coordinate represents the distance of each point from the plane, said cut transform comprising:
   a transform memory addressed by the x coordinate providing as an output the x contribution to the z' coordinate;

a transform memory addressed by the y coordinate providing as an output the y contribution to the z' coordinate;

a transform memory addressed by the z coordinate providing as an output the z contribution to the z' coordinate, said memories being adapted to operate in parallel; and an adder receiving the x, y and z contribution and providing as an output the sum thereof, said sum being a cut characteristic representing which side of the plane a particular point in the image occupies and selecting one of a plurality of spatial transformations in response thereto, whereby each side of the image can be independently manipulated.

8. A process for transforming a set of points in an image, each point represented by at least an initial coordinate n-tuple, the process comprising:

addressing each of a plurality of parallel transform memories by a coordinate of the n-tuple and a transform flag of at least one bit, said memories each providing an intermediate value as an output in response to said coordinate and said transform flag, said transform flag corresponding to different portions of said image and selecting one of a plurality of transformations for said portions; and adding a subset of the intermediate value outputs in an adder, the sum being a single coordinate of a transformed coordinate n-tuple, whereby said portions can be separately manipulated.

9. A process as in claim 8, further comprising:
computing the intermediate values for each of the memories; and
storing the intermediate values in the memories.

10. A process as in claim 8, wherein said transform flag corresponds to different objects in said image, whereby a different transformation can be performed on at least one of the objects.

11. A process for determining the orientation of a set of points with respect to a plane, said points making up an image and being represented at least by a coordinate n-tuple, said process comprising:

addressing each of a plurality of parallel transform memories by a coordinate of the n-tuple, said memories each providing an intermediate value as an output in response to said coordinate; and adding the intermediate value outputs in an adder, the sum being a cut characteristic, said characteristic indicating which side of the plane a particular point in the image occupies and selecting one of a plurality of spatial transformations in response thereto, whereby each side of the image can be independently manipulated.

* * * * *